US012797777B2

(12) United States Patent
Sakraschinsky et al.

(10) Patent No.: US 12,797,777 B2
(45) Date of Patent: Nov. 17, 2026

(54) METHOD FOR FORMING A FILTER MEDIUM

(71) Applicant: HYDAC Filtertechnik GmbH, Sulzbach / Saar (DE)

(72) Inventors: Michael Sakraschinsky, St. Ingbert (DE); Harald Mees, Lebach (DE)

(73) Assignee: HYDAC FILTERTECHNIK GMBH, Sulzbach/Saar (DE)

( * ) Notice: Subject to any disclaimer, the term of this patent is extended or adjusted under 35 U.S.C. 154(b) by 399 days.

(21) Appl. No.: 18/279,723

(22) PCT Filed: Feb. 25, 2022

(86) PCT No.: PCT/EP2022/054786
§ 371 (c)(1),
(2) Date: Aug. 31, 2023

(87) PCT Pub. No.: WO2022/184574
PCT Pub. Date: Sep. 9, 2022

(65) Prior Publication Data

US 2024/0139654 A1 May 2, 2024

(30) Foreign Application Priority Data

Mar. 5, 2021 (DE) ..................... 10 2021 001 192.9

(51) Int. Cl.
*B01D 29/21* (2006.01)
*B01D 29/11* (2006.01)

(52) U.S. Cl.
CPC ............ *B01D 29/21* (2013.01); *B01D 29/111* (2013.01); *B01D 2201/0415* (2013.01); *B01D 2201/291* (2013.01); *B01D 2201/347* (2013.01)

(58) Field of Classification Search
CPC .................. B01D 29/21; B01D 29/111; B01D 2201/0415; B01D 2201/291; B01D 2201/347; B01D 2201/34
See application file for complete search history.

(56) References Cited

U.S. PATENT DOCUMENTS 3,662,895 A 5/1972 Tuffnell ........................ 210/439
3,799,354 A 3/1974 Buckman ...................... 210/493
(Continued)

FOREIGN PATENT DOCUMENTS

DE 21 38 412 3/1973 ............. B01D 46/00
DE 199 10 821 3/1999 ............. B01D 27/08
(Continued)

OTHER PUBLICATIONS

Search Report for International Application No. PCT/EP2022/054786, 5 pages, May 17, 2022.

*Primary Examiner* — Waqaas Ali
(74) *Attorney, Agent, or Firm* — Slayden Grubert Beard PLLC

(57) ABSTRACT

The disclosure relates to a method for forming a filter medium, which is suitable for filtering fluids, for a filter element, said method comprising: applying at least one self-contained sealant onto a fluid-permeable media web in a specifiable direction, producing a solid composite at least between parts of the sealant and the media web, pleating the composite, thereby forming individual filter folds, producing a hollow body in that the two lateral edges of the media web which lie opposite each other so as to adjoin each other and which run transversely to the specified direction are connected together such that in order to obtain at least one seal region on the media web, the respective sealant is arranged on the inner face of the hollow body, a seal is produced for each filter fold, and an end-face seal of the media web is produced.

11 Claims, 9 Drawing Sheets

(56) References Cited

U.S. PATENT DOCUMENTS

| | | | | | |
|---|---|---|---|---|---|
| 5,167,740 | A * | 12/1992 | Michaelis | B01D 46/10 156/227 |
| 5,707,521 | A * | 1/1998 | Erdmannsdoerfer | B01D 46/24 210/489 |
| 2012/0205044 | A1 | 8/2012 | Mees | B29C 65/48 |
| 2013/0015121 | A1 | 1/2013 | Mees | 210/497.01 |

FOREIGN PATENT DOCUMENTS

| | | | | |
|---|---|---|---|---|
| DE | 102010011722 A1 | | 9/2011 | B01D 27/06 |
| FR | 2 175 901 | | 10/1973 | B01D 27/06 |
| GB | 867 004 | | 5/1961 | |
| GB | 880 812 | | 10/1961 | |
| GB | 880812 A | * | 10/1961 | B01D 29/21 |
| GB | 1 408 194 | | 7/1972 | B01D 27/06 |
| GB | 1408194 A | * | 10/1975 | B32B 7/12 |
| WO | 2011 060949 | | 5/2011 | B01D 29/11 |
| WO | WO-2018152090 A1 | * | 8/2018 | B01D 46/521 |

* cited by examiner

METHOD FOR FORMING A FILTER MEDIUM

CROSS-REFERENCE TO RELATED APPLICATIONS

This application claims priority to German Patent Application No. DE 10 2021 001 192.9, filed on Mar. 5, 2021 with the German Patent and Trademark Office. The contents of the aforesaid Patent Application are incorporated herein for all purposes.

BACKGROUND

This background section is provided for the purpose of generally describing the context of the disclosure. Work of the presently named inventor(s), to the extent the work is described in this background section, as well as aspects of the description that may not otherwise qualify as prior art at the time of filing, are neither expressly nor impliedly admitted as prior art against the present disclosure.

The disclosure relates to method for forming a filter medium, which is suitable for filtering fluids, for a filter element.

DE 199 10 821 C2 discloses a method for producing a filter element which is provided in particular for installation in a tank housing of a hydraulic system and has a tubular filter mat as the media web, which filter mat encloses an inner cavity for unfiltered liquid, said cavity being closed off at a bottom end by a lower end cap, which end cap is connected to the adjacent rim of an outer supporting tube surrounding the filter mat, which tube is provided in certain areas with openings and is joined at the top upper end to an upper end cap, which has a flow-through opening for liquid to be filtered, the method including the steps:

a) Flanging the bottom rim of the supporting tube inwards, b) Inserting the lower end cap with a rim-side recessed annular surface surrounding a central raised base part into the flanged bottom rim of the supporting tube, c) Pouring an adhesive into the adhesive bath region defined by the rim-side annular surface of the lower end cap, d) Sliding the filter mat into the supporting tube to form a bond at the lower end cap, e) Providing such an upper end cap, the central through-flow opening of which is surrounded by a recessed rim-side annular surface which defines an upper adhesive bath region and extends radially outwards on the supporting tube beyond the top rim thereof, on which a flange-like, radial extension is formed, providing a retaining surface for supporting the filter element on the rim of an opening of the tank housing f) Filling the adhesive bath region of the upper end cap with adhesive and g) Inserting the top end of the filter mat surrounded by the supporting tube into the adhesive bath region of the upper end cap to form a top bond.

This solution does not require prefabrication of an inner filter unit, so that the inner supporting tube can be omitted. However, the solution requires the production of adhesive bonds between the end caps and the intermediate filter medium in the form of the pleated media web, which involves increased effort in production terms.

WO 2011/060949 A2 discloses a method for forming a filter mat, which is suitable for filtering fluids, from at least one web portion of a mat web, at least one weld line sealing together the layers of at least one web portion of the mat web being formed and subsequently at least one incision being made along the at least one weld line in such a manner that the at least one web portion is cut through to form at least one sealed edge region. In this known solution, part of the weld line remains on the lateral edge(s) of the mat web and thus forms an edge seal due to which the ends of all layers are sealed by means of the welding operation melting the plastic material of the layers. In this way, any unwanted threading or fiber migration at the edges of the fluid-permeable media web is prevented.

SUMMARY

Based upon this prior art, a need exists to provide a method for producing a filter medium for a filter element, which can be carried out in a simple and cost-effective manner. A further need exists to provide a corresponding filter element and a corresponding filter device. Embodiments of the invention are described in the dependent claims, the following description, and the drawings.

DESCRIPTION

Figure 1:
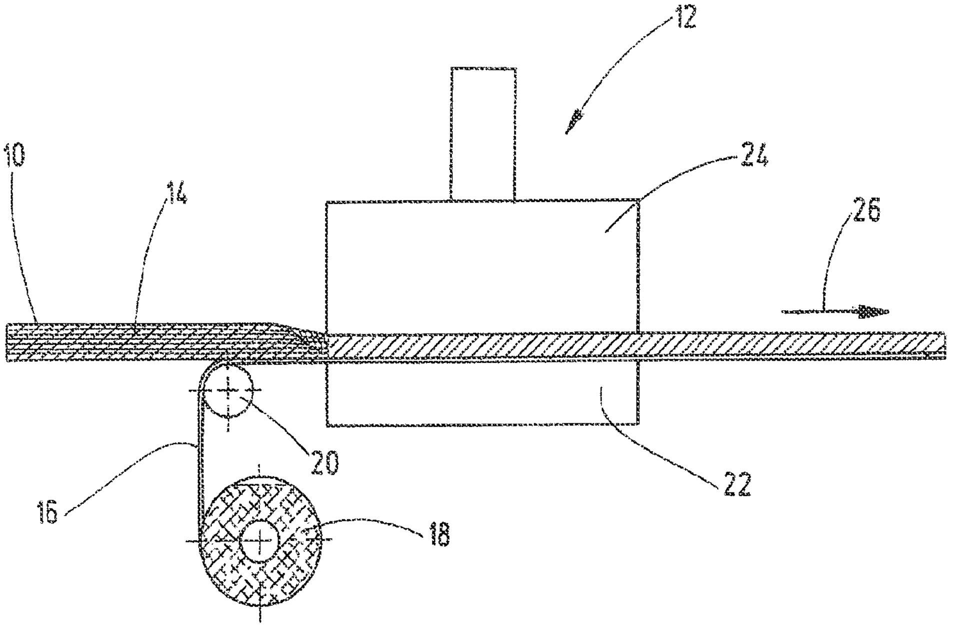
FIGS. 1-3 show example main production steps in the form of a flow chart.

The details of one or more embodiments are set forth in the accompanying drawings and the description below. Other features will be apparent from the description, drawings, and from the claims.

In the following description of embodiments of the invention, specific details are described in order to provide a thorough understanding of the invention. However, it will be apparent to one of ordinary skill in the art that the invention may be practiced without these specific details. In other instances, well-known features have not been described in detail to avoid unnecessarily complicating the instant description.

In some embodiments, a method for forming a filter medium is to be carried out with at least the following process steps:

Applying at least one discrete sealing agent onto a fluid-permeable media web in a predefinable direction, Producing a solid composite at least between parts of the sealing agent and the media web, Pleating the composite to form individual filter pleats, Producing a hollow body in that the two lateral edges of the media web, adjoining each other, opposing each other and extending transverse to the predefinable direction, are joined together such that in order to Obtain at least one sealing region on the media web, the respective sealing agent is arranged on the inside of the hollow body, a seal is produced for the respective filter pleat, and an end-face seal of the media web is achieved.

In this way, in a manner that is cost-effective and simple in production terms, a filter element can be obtained with which an unfiltered medium side is reliably sealed off from a filtrate side of the filter element. The method allows the construction of a filter element without the usual end caps and without the use of adhesive joints to connect the end caps to the fluid-permeable media web, forming a filter element as a whole. A filter element for example produced according to this method has, in the known manner, a fluid-permeable supporting tube which is surrounded by a pleated media web of the filter medium, the filter element being characterised in that the media web has, on at least one of its end regions, a strip-shaped sealing agent which is also folded into the media web and which, as a discrete component, is at least in part firmly connected to the media web. Folding a strip-shaped sealing agent into the media web eliminates the need for adhesive joints as a known sealing agent.

A filter device according to some embodiments is used for receiving such a filter element, the device being provided with a filter head which has an inlet for unfiltered medium and an outlet for filtrate, it being possible to remove, in particular unscrew, an associated filter bowl with the filter element from the filter head, which is fixed in a stationary manner by means of a pipe system. Since the filter element is releasably or firmly connected to the outlet in the filter head by means of a locator fitting of its supporting tube, the filter element can be removed from the device together with its supporting tube in an easily replaceable manner or, with the supporting tube remaining on the filter head, only the filter medium to be replaced is removed with its respective sealing agent, attached adhesive-free. The latter solution in particular can be implemented in a particularly environmentally friendly manner.

Further embodiments of the method according to the teachings herein, the filter element according to the teachings herein and the associated filter device are the subject matter of the dependent claims.

The solution according to the teachings herein is explained in greater detail below with reference to the FIGS. Specific references to components, process steps, and other elements are not intended to be limiting. Further, it is understood that like parts bear the same or similar reference numerals when referring to alternate FIGS.

Viewed in the direction of FIG. 1, individual media layers 10 arranged one above the other are fed on the left-hand side to a welding device designated as a whole by 12. The multi-layer construction of such a filter mat or media web 14 for a filter medium 15 of a filter element 17 can, for example, have the following layer structure from one side to the other:

1. Metal wire cloth or synthetic wire cloth or plastic mesh with net structure,
2. Polyester nonwoven,
3. Fiberglass mat or meltblown nonwoven,
4. Fiberglass mat or meltblown nonwoven, paper nonwoven or polyester nonwoven,
5. Stainless steel polyester blended fabric or a plastic blended fabric, and
6. Metal wire cloth or synthetic wire cloth or plastic mesh with net structure.

Other combinations of layers are readily possible here and the layer structure is determined by the requirements that will later be placed on a finished filter element for cleaning off particulate contamination.

As further emerges from FIG. 1, a strip-shaped sealing agent 16 is fed from the underside of the media web 14 and upstream of the welding device 12, which sealing agent coming from an unwinding roll 18 is fed to the media web 14 via a deflection roller 20 parallel to said media web. The welding device 12 is configured as an ultrasonic welding device with an anvil 22 and a sonotrode 24 which can be moved up and down. Embodiments are conceivable in which the sonotrode 24 is arranged stationary and the anvil 22 moves vertically up and down when viewed in the direction of FIG. 1. The predefinable direction for applying the discrete sealing agent 16 onto the fluid-permeable media web 14 is shown by an arrow 26.

Figure 2:
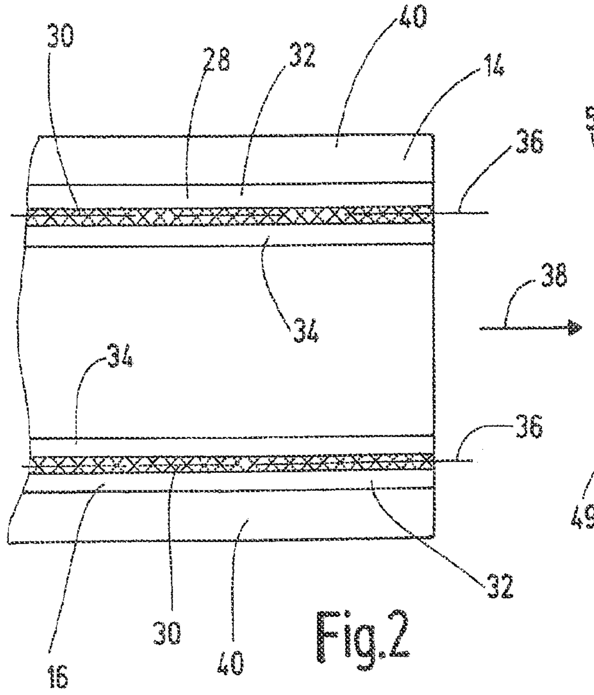

In front of or behind the drawing plane according to the diagram in FIG. 1, the feed device shown there is also present in duplicate for a further sealing agent 28 as is the welding device 12. Accordingly, as an intermediate production step, a media web configuration is produced as shown from above in FIG. 2, which is a bottom view of FIG. 1 and has two strip-shaped sealing agents 16 and 28 at the edges. The respective sealing strip in the form of the sealing agent 16, 28 has a width of approx. 30 mm and the sonotrode 24 applies a weld seam or weld line 30 of approx. 10 mm width in the center of each. In this respect, the respective weld line 30 runs approximately centrally on the respective strip-shaped sealing agent 16, 28 according to the partial diagram according to FIG. 2.

Figure 3:
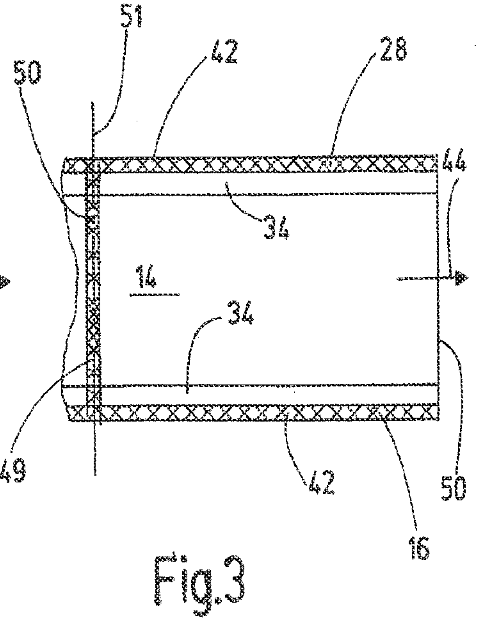

Furthermore, starting from the respective weld line 30 applied in longitudinal direction 26, the respective sealing agent 16, 28 rests loosely on the upper side of the media web 14 with an outer longitudinal strip 32 and, in contrast, an inner longitudinal strip 34, which strips are likewise firmly connected to each other with their individual media layers 10 in the region of the weld line path 30. Subsequently, as already described in WO 2011/060949 A2, incorporated by reference herein, the respective weld line 30 is cut through in the longitudinal direction along separating lines 36 parallel to a transport direction 38 in continuation of the direction 26 so that a media web 14 remains, according to the diagram in FIG. 3. The two cut-off edge strips 40 form the so-called waste strips; however, it is also possible to arrange several web portions side by side so that the result is a plurality of finished media webs 14 according to the diagram in FIG. 3. For example, three to five such media webs 14 can also readily be arranged side by side, viewed transversely to the transport direction 38, in a composite then to be separated along the separation lines 36. Cutting through the media web 14 along the respective separating line 36 is for example performed in the center of the weld line 30 to ensure that the remaining web-like weld seam 42, as shown in FIG. 3, holds the individual media layers firmly together in the composite, and the inner longitudinal strip 34 of the respective strip-shaped sealing agent 16, 28 continues to rest loosely on the uppermost media layer 10 of the layer composite in the form of the media web 14.

Figure 5:
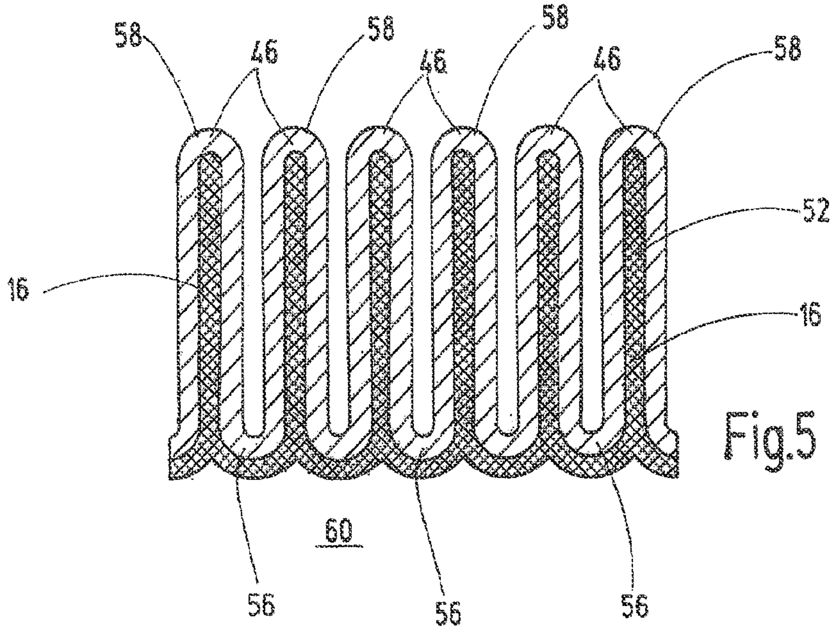

In a further transport direction denoted by 44, a pleating system follows, as shown by way of example in WO 2011/060949 A2, and in the process individual filter pleats 46 are produced as a further production step, as shown in FIG. 5. As further shown in WO 2011/060949 A2, incorporated by reference herein, a transverse weld seam 49 can be introduced for example before the pleating operation and also certainly after the pleating operation and extending transverse to the weld line 30, 42, which is likewise cut through along a transversely extending separating line 51 so as in this way to produce media webs 14 of a predefinable length in order to obtain a cylindrical hollow body 48, as shown by way of example in FIG. 10. For this purpose, the media web 14 is assembled to form the cylindrical hollow body 48 and is firmly joined together at the two opposing lateral edges 50 by welding. In any case, cutting through the respective web-like weld seam 30, 49 longitudinally and transversely to the respective media web 14, as seen, has the benefit that the fiber material of the media layers 10 is also welded in and thus there is no unintentional threading with fiber discharge which could otherwise reach the filtrate side of the filter element 17 as particle contamination in the fluid flow.

Thermoplastic filter media, such as a nonwoven or spunbonded nonwoven, are used as the strip-shaped sealing agent 16, 28 to be welded on. Meltblown plastic fibers, which are also known technically as meltblown fibers, can be used for the nonwoven. Nonwovens with 90% polyethylene and 10% polypropylene content have proven to be particularly suitable. Suitable spunbonded nonwovens are those that are hydroentangled or spunlaced and a thickness of between 0.6 and 1.3 mm is particularly beneficial for the nonwovens.

Figure 4:
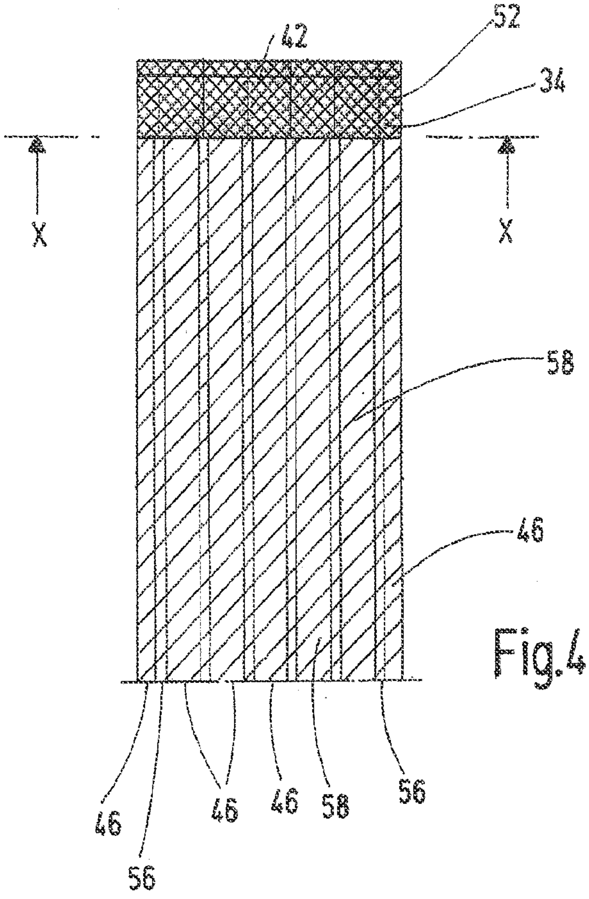
FIGS. 4-5 show a partial detail of an example pleated filter mat web with sealing agent folded in, once in a top view, once in a view along the section line X-X in FIG. 4.

As can be seen in particular from FIG. 4, a sealing region 52 is obtained on the media web 14 at least at one end of the media web 14. FIG. 4 shows only one sealing region 52. According to the diagram in FIG. 10, however, there is for example also a further sealing region 54 on the opposite side of the mat or media web 14 which is configured identically to the sealing region 52.

As can readily be seen in FIG. 5, the individual filter pleats 46 extend with an identical pleat height between a pleat trough 56 and a pleat crest 58. Each individual filter pleat 46 forms a gap between an ascending and a descending pleat side, the gap being completely filled by the folded-in sealing agent 16, 28. This strip-shaped sealing agent 16, 28 is moreover guided along the arched path of the pleat trough on the inner side 60 of the pleat troughs 56 concerned. As already explained, with regard to the welding-on operation, the respective sealing agent 16, 28 is firmly connected to the pleat path of the filter pleats 46 along the weld seam 42. As can additionally be seen from FIG. 4, the respective sealing region 52, 54 has this weld seam 42 towards the outside along which the media webs 10 and the respective sealing agent 16, 28 are firmly welded to the filter medium 15, whereas the respective inner longitudinal edge or longitudinal strip 34 rests loosely on an upper side of the media web 14 in a folded-in manner, as shown in the diagram according to FIG. 5.

Figure 10:
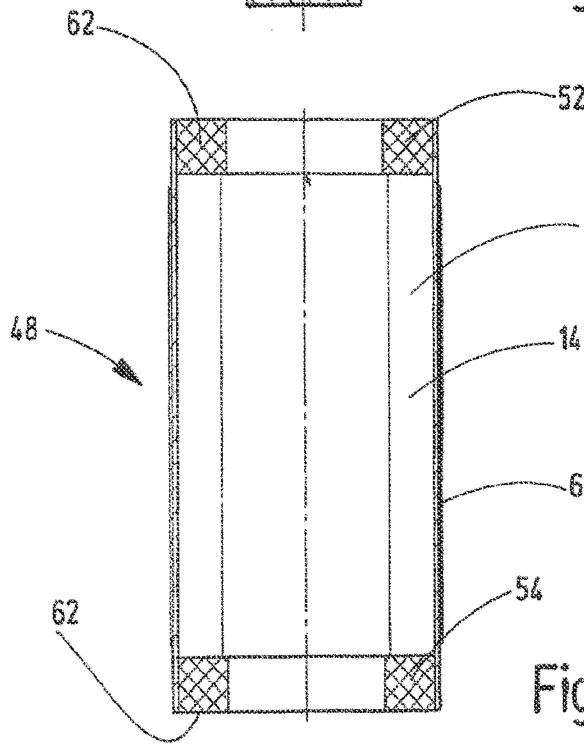
FIG. 10 show an embodiment of a filter medium as a hollow body shown in the form of a longitudinal section.

According to the diagram of FIG. 10, the respective sealing agent 16, 28 is arranged along the two end faces 62, opposing each other, in the associated end regions of the hollow body-like media web 14, which end regions form the sealing regions 52, 54 of the filter medium 15.

The hollow cylindrical filter medium 15 produced in this respect, which has the two sealing regions 52 and 54 on the end face, is shown in FIG. 10. The media web 14 of the filter medium 15 is enclosed on the outer circumference by a film-like, fluid-permeable surrounding casing 64. Such a surrounding casing is disclosed by way of example in DE 10 2010 011 722 A1, incorporated by reference herein, it being possible for the film forming the outer sleeve as the surrounding casing 64 to consist of a polyamide or polyethylene compound. Other film materials are polyester or epoxy polyurethane. Overall, the surrounding casing 64 can be formed of a similar plastic as that mentioned above with good hot-melt characteristics and the web-like film can be joined along its opposing lateral edges, thereby forming the hollow cylindrical surrounding casing 64, by an ultrasonic welding process or by means of a welding laser. The film is appropriately perforated for passage of a fluid and the hollow cylindrical surrounding casing 64 can be slid onto the hollow body-like media web 14 from the outside as an independent component. Since the filter pleats 46 are correspondingly pliable, a slide-on operation to this effect is readily possible and the filter pleats 46 are held in their position by the surrounding casing 64.

Another production option is to lay the film-like surrounding casing 64 around the media web 14 and then to weld the overlapping lateral edge regions of the film together for the purpose of obtaining the surrounding casing 64 which is insofar closed. As FIGS. 9, 10, 13 and 15 show, the surrounding casing 64 can leave the two regions 52, 54 free; however, according to FIGS. 6 to 8 and 12, 14, 16 and 17, it is also possible to extend the surrounding casing 64, viewed in the axial direction, in such a manner that the sealing regions 52, 54 are still enclosed on the outer circumference so that in this respect the folded-in sealing agent 16, 28 can also be supported on the outer circumference on the relevant parts of the surrounding casing 64. In an embodiment according to the diagram in FIG. 11, the surrounding casing 64, viewed in the direction of FIG. 11, only encloses the upper sealing region 52 while leaving the lower sealing region 54 free.

In all the production methods described above, the filter medium 15 is produced in this respect without adhesives, which enables particularly cost-effective implementation, particularly if no additional end caps are required and, by avoiding adhesive joints, the filter medium 15 is implemented in an environmentally friendly manner, particularly with regard to disposal. The filter medium 15 can now be further developed to form the complete filter element 17, as shown by way of example in FIG. 6. In this respect, the filter element 17 has, on the side of its inner circumference, a hollow cylindrical supporting tube 66 which is provided in the region of the media web 14 with a plurality of fluid passages in the manner of a perforation 68. In this case, the pleated media web 14 rests with its individual pleat troughs 56 on the outer circumference of the hollow cylindrical supporting tube 66.

In the region of the two sealing regions 52, 54, the supporting tube 66 is provided with a closed perimeter wall along which, in a central arrangement, an annular sealing bead 70 protrudes, which in each case is an integral component of the supporting tube 66 and which engages with a predefinable pretension in the respective sealing region 52, 54 in order to increase the effect of the sealing force for the respective sealing region 52, 54. Seen in cross-section, the respective sealing bead 70 is bowl-shaped, in particular hemispherical, with a radius between 0.3 mm and 1.0 mm, for example with a radius between 0.5 mm and 0.9 mm, for example with a radius of 0.8 mm. The sealing bead 70 compresses the pleat crests and consequently the pleat troughs 56 in such a manner that a circumferentially flat region is formed on the filter mat or the media web 14, which region rests completely on the sealing bead 70 and seals the media web 14 off from the supporting tube 66 with its closed perimeter wall in this region. Good sealing results have also been achieved when the sealing bead has a triangular shape viewed in cross-section, as shown by way of example in FIG. 7. The embodiment according to FIG. 7 differs in this respect from the otherwise identically configured embodiment of a filter element 17 according to FIG. 6.

Figure 6:
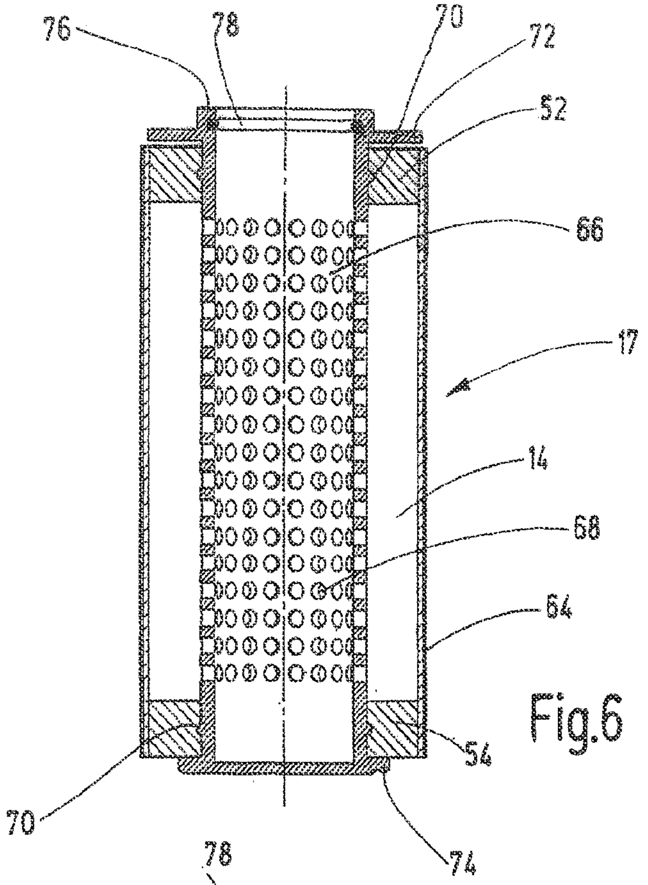
FIGS. 6, 7, 11-15 show various embodiments of filter elements shown in the form of a longitudinal section.
Figure 7:
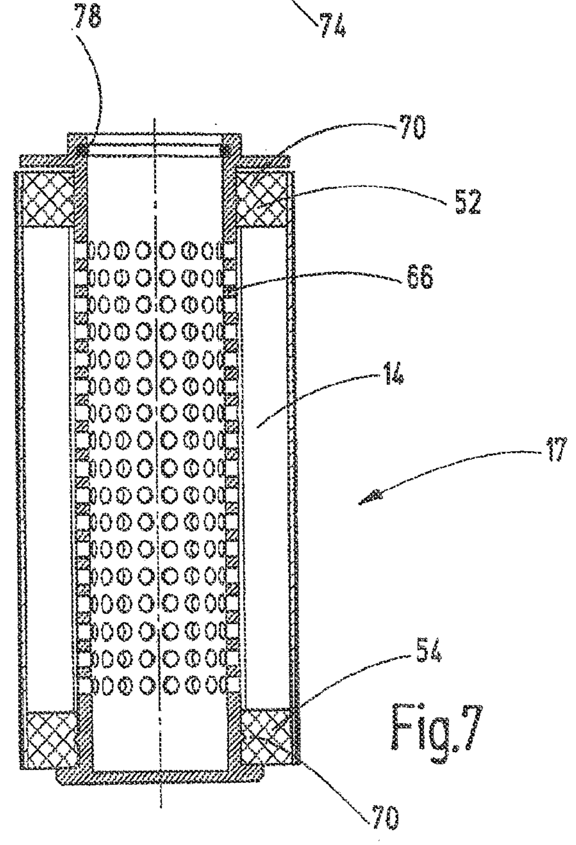

As further emerges from FIGS. 6 and 7, the supporting tube 66 has a ring-like broadening 72, 74 on its two opposing ends which at least partially overlaps the adjacently arranged sealing agent 16 and 28 in each case. Viewed in the direction of FIGS. 6 and 7, in this case the upper, ring-like broadening 72 has a larger diameter than the lower broadening 74. In addition, the further lower sealing region 54 rests on the ring-like broadening 74, whereas there is an axial gap between the upper side of the sealing region 52 and the lower side of the ring-like broadening 72 which, on the one hand, illustrates that the respective broadening 72, 74 is not only required for sealing of the filter medium 15, and allows a certain length adjustment between the geometry of the supporting tube 66 and the hollow body-like filter medium 15 as tolerance compensation. Since, in the embodiment according to FIGS. 6 and 7, the supporting tube 66 is configured as a one-piece, closed body, the media web 14 is to be placed around the outer circumference of the supporting tube 66 with subsequent joining of the sides 50 directed towards each other, for example by means of an ultrasonic welding process. Subsequently, the surrounding casing 64 can be slid onto the pleated media web 14 from the outside, as previously described, or it can likewise be placed around the hollow cylindrical media web 14 as a web portion and welded along the free lateral or longitudinal edges to form a hollow tube.

Furthermore, the supporting tube 66 has at its upper free end a tubular locator fitting 76 protruding beyond the upper broadening 72 which forms an annular receiving groove on the inner circumference for receiving a locator ring 78 in the manner of an O-sealing ring made of elastomer material.

Figure 8:
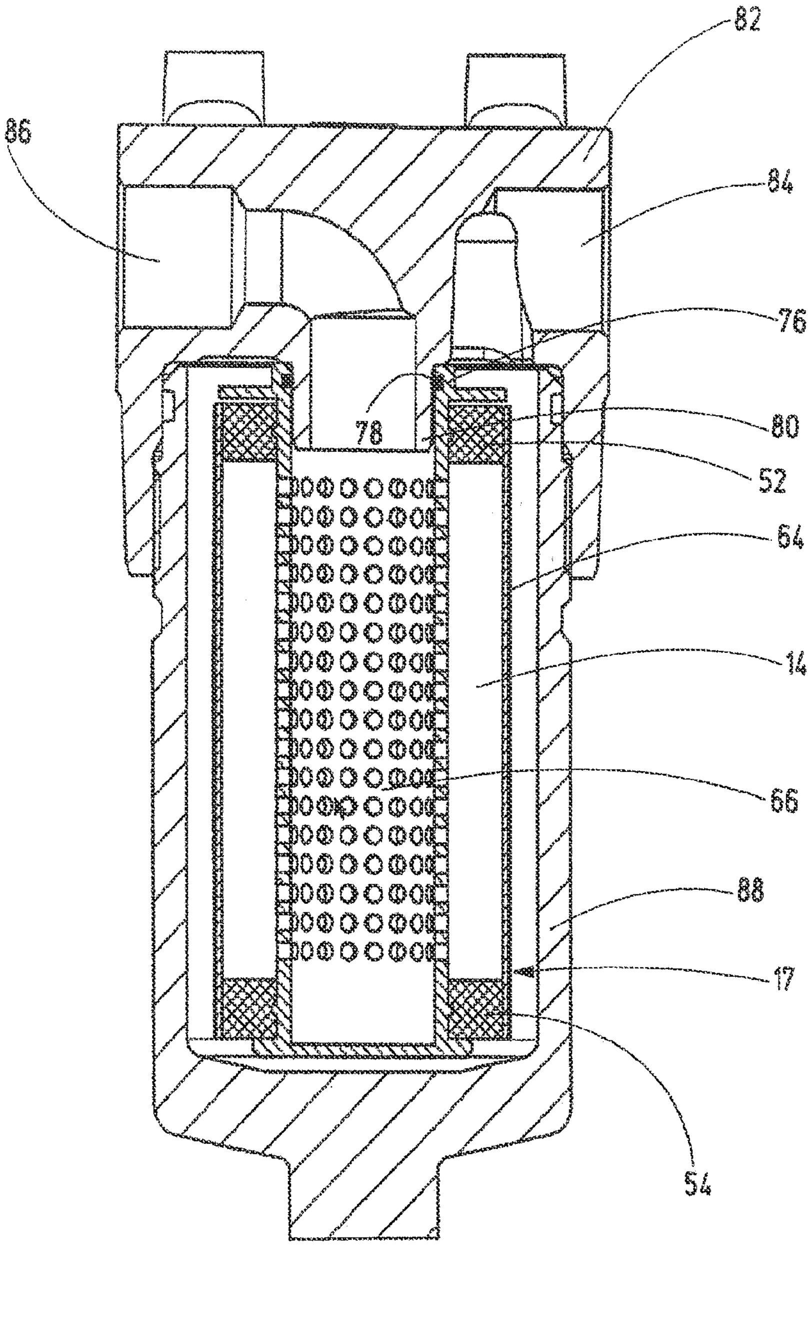
FIGS. 8, 9, 16, 17 show various embodiments of filter devices.

As shown in particular in FIG. 8, the filter element 17 according to FIG. 6 can be slid with its locator fitting 76 by means of the locator ring 78 onto a corresponding connection fitting 80, which is part of a filter head 82 that is stationarily arranged on a pipe system which is not shown in greater detail. In this respect, the filter head 82 has an inlet 84 for unfiltered medium and an outlet 86 for filtrate. The filter element 17 is thus slid onto the connection fitting 80 of the filter head 82 as a filtrate outlet and a seal is created between the unfiltered medium side and the filtrate side of the filter device by means of the locator ring 78. A filter bowl 88 is screwed onto the filter head 82 from below, in which filter bowl the replaceable filter element 17 is received as a whole. Filter element 17 and filter bowl 88 can be fixed to the filter head 82 in succession; however, if the design is appropriate, it is also possible to attach the filter bowl 88 to the filter head 82 together with the filter element 17. The flow of unfiltered medium coming from the inlet 84 flows through the filter element 17 from the outside to the inside in the device housing and any particle contamination remains in the filter material of the media web 14.

Figure 9:
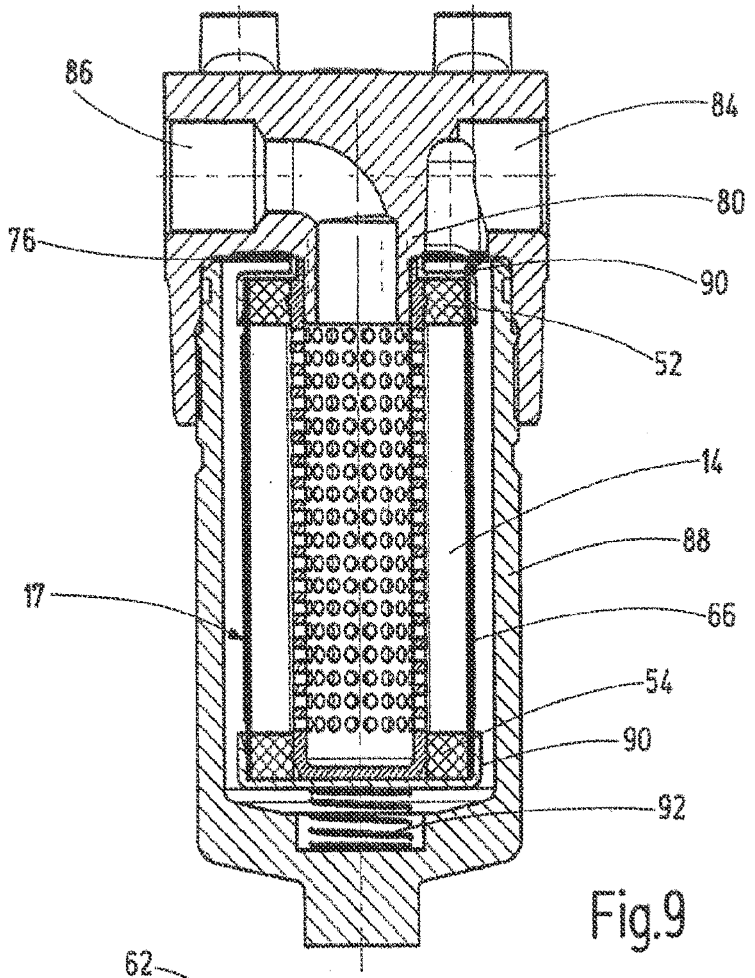

In the device solution according to FIG. 9, the solution is modified with respect to that of FIG. 8 in that the locator fitting 76 is now pressed onto the connection fitting 80 of the filter head 82 from the outside with any further elastomer locator ring 78 and is thus firmly connected to the connection fitting 80. In addition, the filter element 17 has two end caps 90 which receive between them the pleated media web 14 with the two sealing regions 52, 54. The upper end cap 90 is pressed onto the free end of the locator fitting 76 and thus also onto the supporting tube 66, and the lower end cap 90 rests on a compression spring 92 which rests in turn with its lower end on a housing base of the filter bowl 88, in the operating position shown in FIG. 9. By means of the compression spring 92, the filter mat or media web 14 is clamped by the two end caps 90 and, in this respect, the media web ends with the two sealing agent or sealing regions 52, 54 are compressed by the caps 90 and pressed against the respective annular sealing bead 70 on the supporting tube 66. The solution according to FIG. 9 implements a so-called coreless variant in which the outer sleeve in the form of the surrounding casing 64 terminates axially in front of the sealing regions 52, 54 at the end of the filter mat or media web 14. Although in this respect, in the solution according to FIG. 9, no locator ring 78 is used, the design shown produces a secure seal between the unfiltered medium region and the filtrate region within the filter device.

Since, in the solution according to FIG. 9, the supporting tube 66 with the upper end cap 90 is an integral part of the filter head 82, for a replacement operation the element, in the form of the filter medium 15, is slid over the supporting tube 66 from below until the upper end, in the form of the sealing region 52, rests on the underside of the upper end cap 90 of the supporting tube 66 and is radially pretensioned by this end cap 90. Then the lower end cap 90 is slid onto the filter medium 15 with the lower sealing region 54 until the lower end cap 90 comes into contact with the supporting tube 66 which is closed at the bottom. Here, the lower end of the element, in the form of the sealing region 54, is radially pretensioned by the lower end cap 90. Finally, the filter bowl 88 as a part of the filter housing with the compression spring 92 is screwed into the filter head 82 and the compression spring 92 prevents the lower end cap 90 from slipping down unintentionally and the element composite described from becoming detached.

Figure 11:
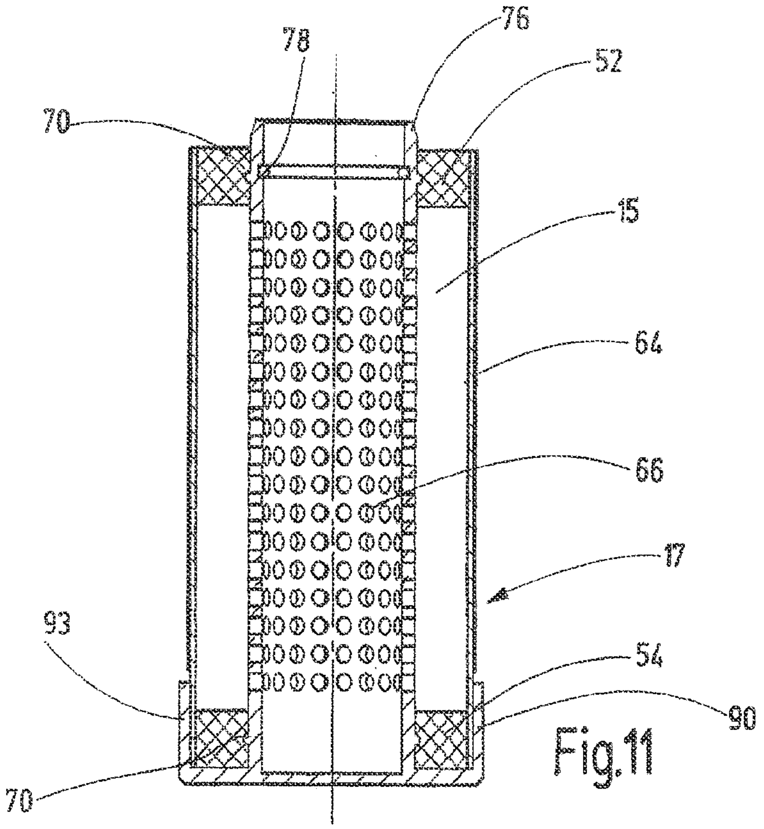

In the embodiment according to FIG. 11, a one-piece supporting tube 66 is used and in this respect the lower end cap 90 is now a component of said supporting tube 66. The filter medium 15 with the two sealing regions 52, 54, viewed in the direction of FIG. 11, is clamped at the top by means of the sleeve in the form of the surrounding casing 64 and at the bottom with the cap 90 as a one-piece component of the supporting tube 66. At the same time, the lower end cap 90 with its cylindrical surrounding rim 93, with rim-side protrusion, upwardly encloses the lower sealing region 54 of the media web 14. Adjacent thereto, the surrounding casing 64 starts which, enclosing the upper sealing region 52, terminates in a mutually extending horizontal plane beyond which the ring-like locator fitting 76 protrudes. In this respect, the solution according to FIG. 11 creates an adhesive-free, functional filter element 17.

Figure 12:
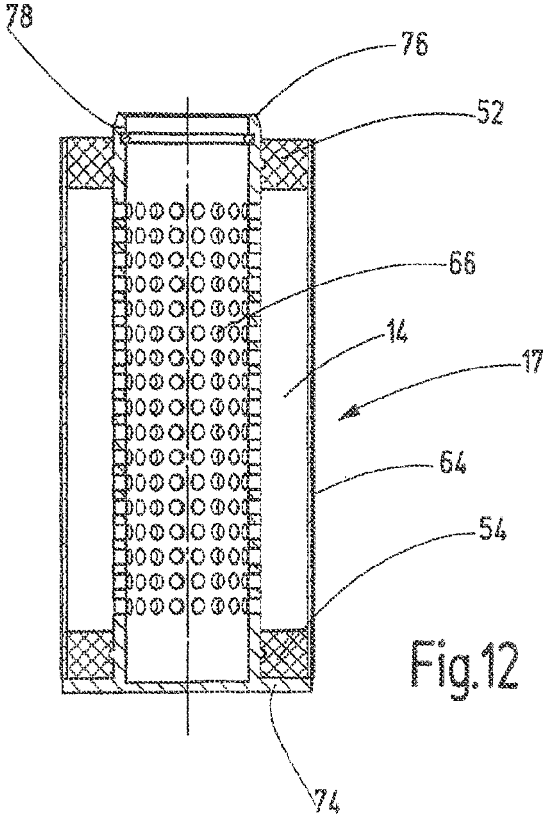

In the embodiment according to FIG. 12, the supporting tube 66 has the ring-like broadening 74 on the base side, which broadening now extends in the radial direction over the entire underside of the lower sealing region 54, replacing the lower end cap 90. In the aforementioned embodiment, the pleated media web 14 with the sealing regions 52, 54 is then clamped outwardly only by means of the hollow cylindrical surrounding casing 64. In this respect, the film-like, perforated surrounding casing 64 extends over both sealing regions 52, 54 while leaving the outer circumferential rim of the lower broadening 74 to come into contact with the media web 14 on the outer circumferential side. In addition, unlike the embodiment according to FIG. 11, the locator ring 78 is not arranged at the level of the upper sealing bead 70 but is located rather in the horizontal plane of the free end of the upper sealing region 52 with the upper face end of the surrounding casing 64.

Figure 13:
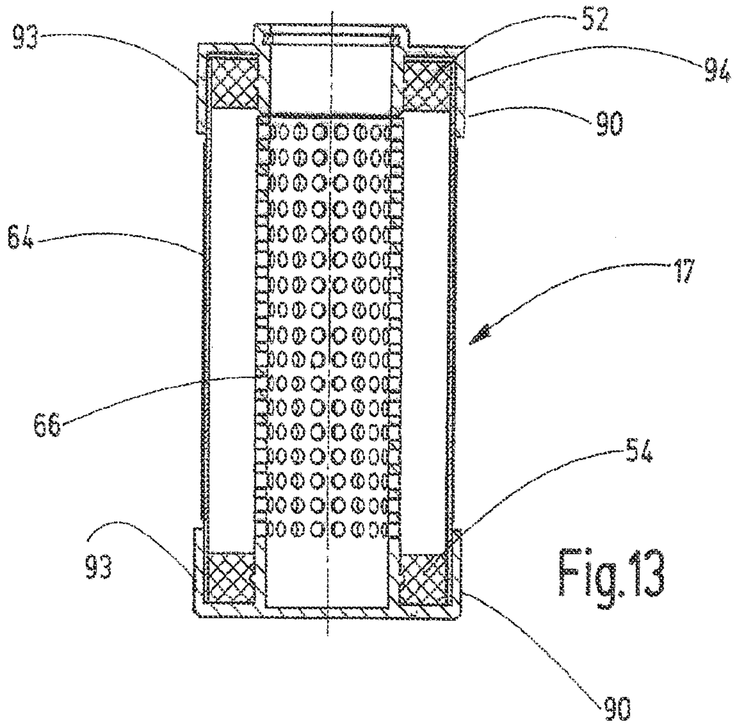
Figure 14:
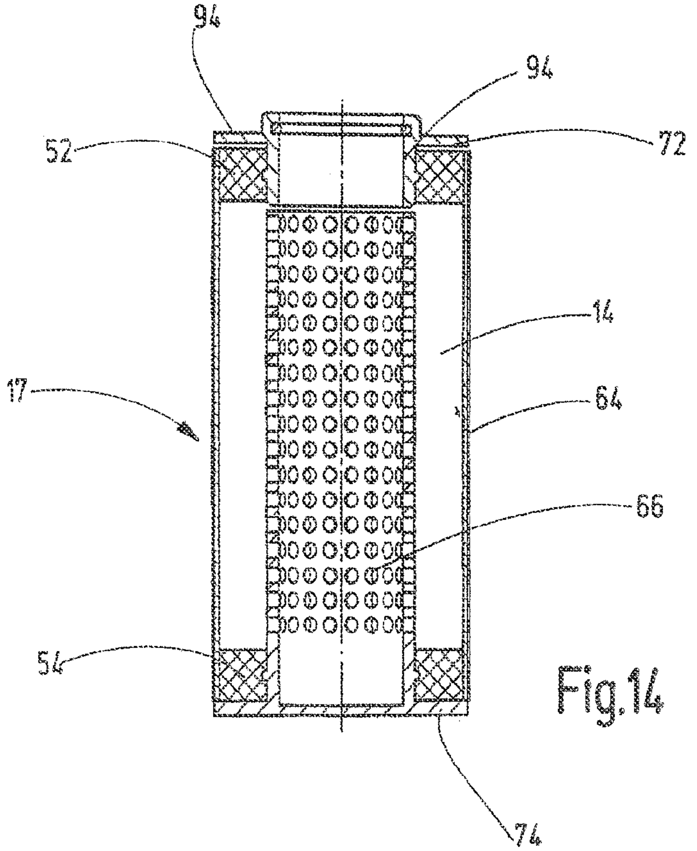

In the embodiments according to FIGS. 13 and 14, the supporting tube 66 is divided in its upper end region and now has a separate cap portion 94. The media web 14 with its respective sealing region 52, 54 is thereby clamped between the upper end cap 90 of the cap portion 94 and the lower end cap 90, for example here again a compression spring 92 within a housing device, comparable to the solution according to FIG. 9, being able to take over application of the contact pressure for the cap composite. Otherwise, the upper end cap 90 as well as the lower end cap 90 is configured comparably to the solution according to FIG. 11.

In this respect, the upper cap portion 94 comprises the upper end cap 90 which circumferentially encloses the upper sealing region 52 with a cylindrical surrounding rim 93. In addition, the cap portion 94 comprises the already introduced locator fitting 76 with the locator ring 78 arranged on the inner circumference thereof. Furthermore, the associated sealing bead 70, as part of the cap portion 94, presses the upper sealing region 52 against the flank-like downwardly protruding circumferential rim 93, of the upper end cap 90 formed in this respect. In the embodiment according to FIG. 13, moreover, the lower end cap 90 is configured comparably to the upper end cap 90 and protrudes with a predefinable axial protrusion beyond the end side of the sealing region 54. In this case, the surrounding casing 64 extends in a media web portion between the two opposing end caps 90.

In the embodiment according to FIG. 14, the upper cap portion 94 has the ring-like broadening 72 and likewise the supporting tube 66 is provided on its lower end with the ring-like broadening 74, comparable to the solution according to FIG. 12.

In the embodiments according to FIGS. 11 to 14, the media web 14 in particular with its two sealing regions 52, 54 can be installed on the supporting tube 66 by sliding it on and then an upper end cap 90 or the cap portion 94 can be attached subsequently, also by sliding it on.

Figure 15:
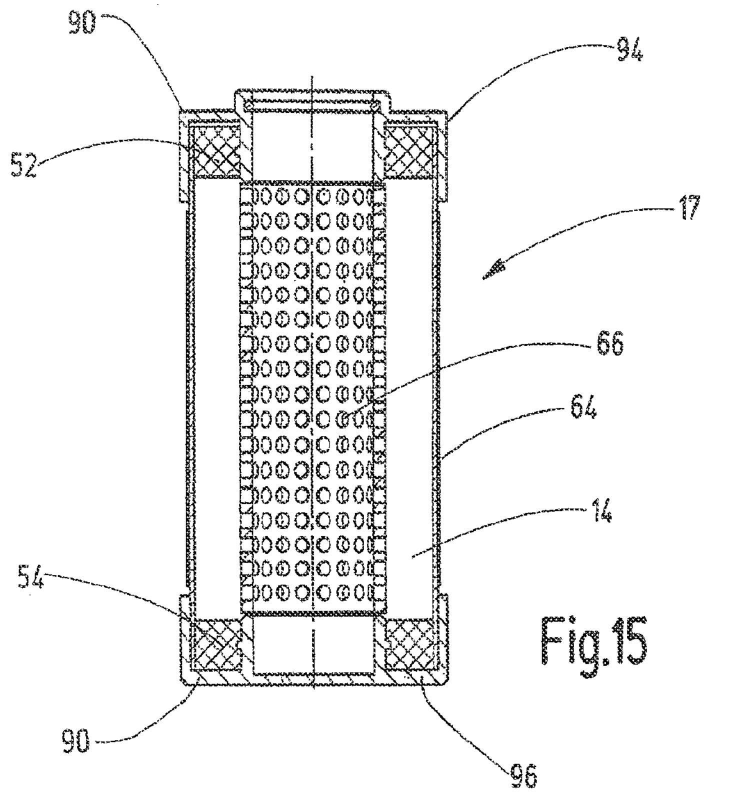

In the embodiment according to FIG. 15, a separate lower cap portion 96 is now also provided, comparable to the configuration with the upper cap portion 94. This increases the modularity for the construction of a filter element 17 by being able to freely assemble largely individual portions thereof. In this way, for example, a supporting tube 66 of different axial length can easily be connected to media webs 14 of comparable length and the cap portions 94, 96 can be used subsequently to complement the overall filter element 17. In the embodiments according to FIGS. 11 to 15, the locator fitting 76 with integrated locator ring 78 is again used, comparable to the diagram according to FIG. 8, to slide the respective filter element 17 onto the connection fitting 80 of the filter head 82 for a fixing operation in a separable manner when replacing the element for a new element 17.

Figure 16:
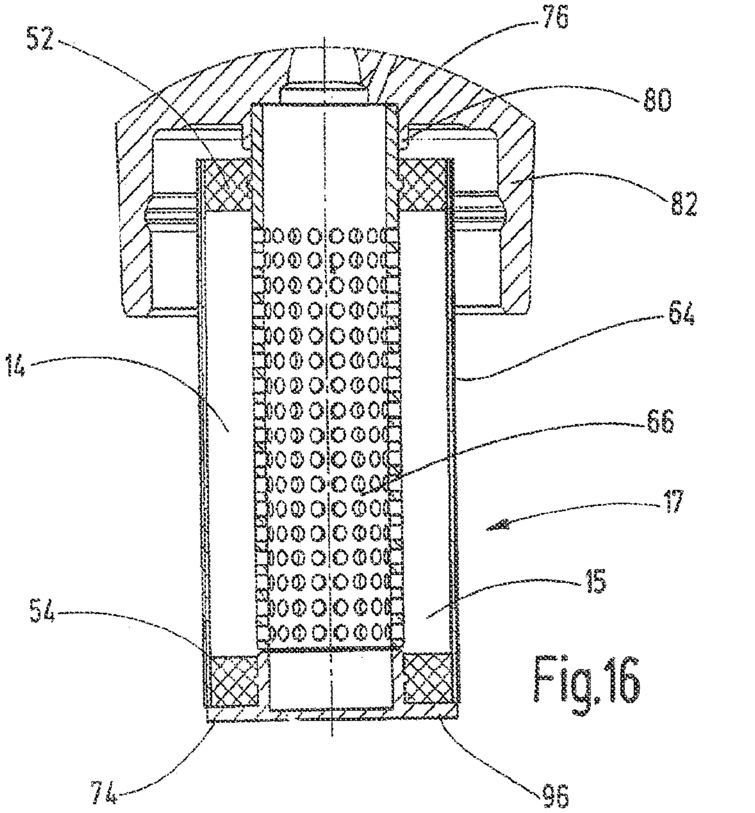

In the partially shown housing embodiment according to FIG. 16, a filter element 17 with a tubular locator fitting 76 is pressed into the inside of the connection fitting 80 of the filter head 82 so that the supporting tube 66 remains stationary on the filter head 82. A lower cap portion 96, which is configured separately from the remainder of the supporting tube 66, can then be withdrawn from the remaining supporting tube 66 for a replacement operation together with the surrounding casing 64, the pleated media web 14 and the two sealing regions 52, 54. For this purpose, the surrounding casing 64 encompasses the upper sealing region 52 and the lower sealing region 54 both with its axial installation length and on the outer circumference. The elasticity for the sealing regions 52, 54 is selected in such a manner that it is possible to withdraw the filter medium 15 as a whole despite the respective sealing bead 70. If the filter medium 15 is soiled due to increasing particle contamination, the spent medium can be replaced with a new medium 15 and the new element is slid in until the upper annular rim of the lower ring cap portion 96 comes into contact with the lower free end face of the supporting tube 66.

Figure 17:
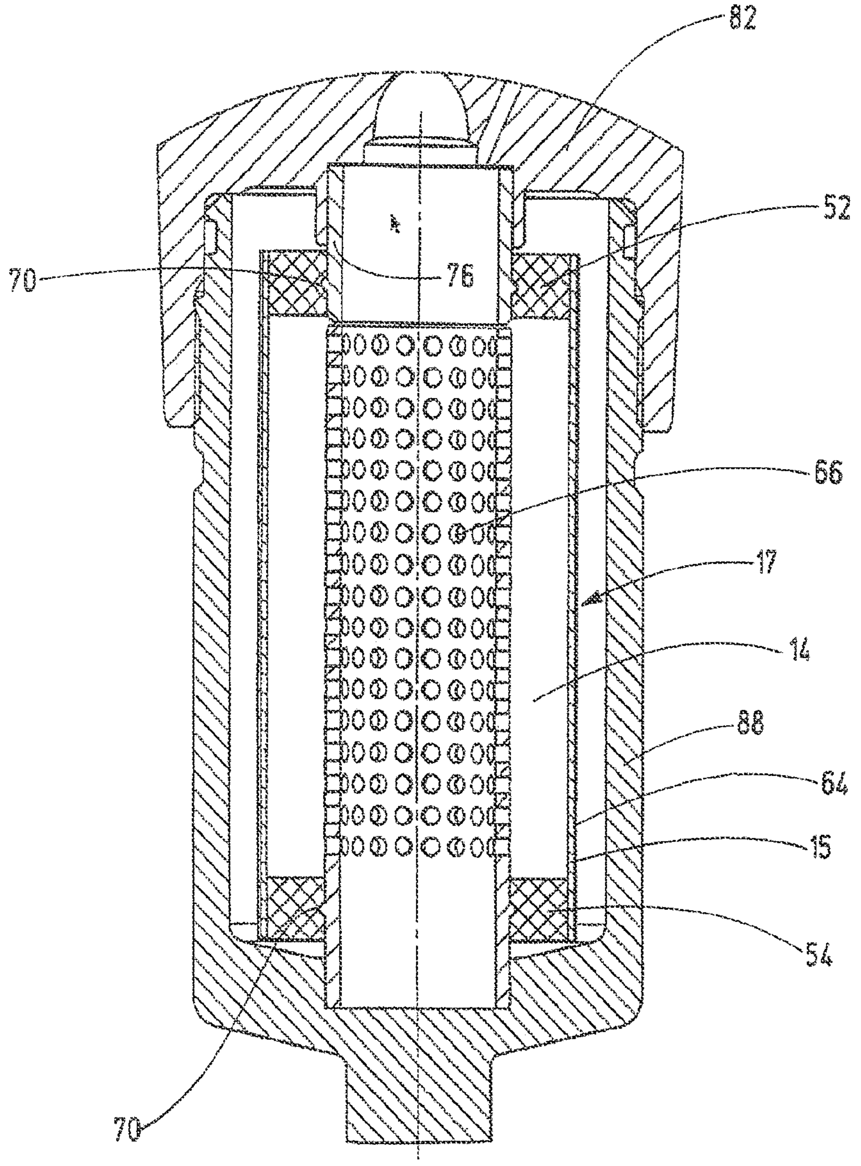

In the embodiment according to FIG. 17, in a particularly simple configuration of a coreless adapter, neither a cap portion 94 nor a cap portion 96 nor any other end cap 90 and also no ring-like broadening 72, 74 of any kind is necessary, but rather a solution comparable to the configuration according to FIG. 10 is sufficient here; however, on proviso that here again the surrounding casing 64 also encloses both sealing regions 52, 54. In this respect, the surrounding casing 64 rests with the lower sealing region 54 on the inside of the filter bowl 88. Furthermore, the supporting tube 66 can be removed from the upper locator fitting 76 remaining in the filter head 82 by withdrawing it. In this respect, increased modularity in the sense of a modular system is created for the comparable solution according to FIG. 17. In this case too, the media web 14 is clamped by the sleeve in the form of the surrounding casing 64. If the lower end of the supporting tube 66 is pressed into the base of the housing bowl or filter bowl 88 to a greater extent compared to the upper locating position in the filter head 82 by means of the locator fitting 76, in this respect the entire filter element 17 can also be withdrawn from the filter head 82 and removed in this manner when replacing the element for a new element 17. Further embodiments of an element structure to this effect are possible.

The invention has been described in the preceding using various exemplary embodiments. Other variations to the disclosed embodiments may be understood and effected by those skilled in the art in practicing the claimed invention, from a study of the drawings, the disclosure, and the appended claims. In the claims, the word “comprising” does not exclude other elements or steps, and the indefinite article “a” or “an” does not exclude a plurality. A single processor, module, or other unit or device may fulfill the functions of several items recited in the claims.

The term “exemplary” used throughout the specification means “serving as an example, instance, or exemplification” and does not mean “preferred” or “having advantages” over other embodiments. The terms “in particular” and “particularly” used throughout the specification means “for example” or “for instance”.

The mere fact that certain measures are recited in mutually different dependent claims or embodiments does not indicate that a combination of these measures cannot be used to advantage. Any reference signs in the claims should not be construed as limiting the scope.

What is claimed is:

1. A method for forming a filter medium, which is suitable for filtering fluids, for a filter element, the method comprising at least:

applying at least one discrete sealing agent onto a fluid-permeable media web in a direction;

producing a permanent bond at least between parts of the sealing agent and the media web;

pleating the composite, thereby forming individual filter pleats perpendicular to the direction;

dividing the pleated media web into web sections transverse to the feed direction in predefined lengths: wherein a separating cut to this effect is performed in a transverse weld of the media web;

producing a hollow body by joining together two lateral edges of the media web, adjoining each other, opposing each other and extending transverse to the direction, such that at least one sealing region on the media web is obtained; wherein the respective sealing agent is arranged on the inside of the hollow body, a seal is produced for each filter pleat, and an end-face seal of the media web is provided; wherein the sealing agent is formed from a strip of material for the purpose of obtaining a sealing strip, which sealing agent consists at least in part of a weldable plastic material and which, after being applied to the media web, is welded on using a welding process to produce the permanent bond.

2. The method of claim 1, comprising:

feeding the respective sealing strip in the direction as transport direction for pleating the composite of media web; and welding the sealing strip to the media web along a weld line in such a manner that, at least in the direction of the media web, a longitudinal strip of the sealing agent rests freely on the media web; and subsequently cutting the media web along the weld line in such a manner as to obtain a waste strip or a further media web, so that the remaining welding line seals the media web and that the longitudinal strip lying freely on the media web seals the filter pleats after pleating.

3. The method of claim 1, comprising dividing the pleated media web into web sections transverse to the feed direction in predefined lengths before the hollow body is produced.

4. The method of claim 1, wherein an ultrasonic welding process is performed as the welding process.

5. The method of claim 1, wherein the respective sealing agent is arranged along the two end faces opposing each other, in the associated end regions of the hollow body-like media web.

6. The method of claim 1, wherein the filter medium is produced without adhesive and the filter pleats are outwardly enclosed by a film-like, fluid-permeable surrounding casing.

7. The method of claim 1, wherein thermoplastic synthetics are used for the strip-shaped sealing agent to be welded on.

8. A filter device comprising the filter element, formed by the method of claim 1.

9. The method of claim 1, wherein the filter element is formed without end caps.

10. The method of claim 1, wherein the filter element is formed without the use of adhesive joints to connect end caps to the fluid-permeable media web.

11. The method of claim 1, wherein the strip-shaped sealing agent is formed from one or more of a thermoplastic filter medium, a nonwoven, and a spunbonded nonwoven.

* * * * *